United States Patent
Anderson et al.

(10) Patent No.: US 12,352,262 B2
(45) Date of Patent: Jul. 8, 2025

(54) LINEAR COMPRESSOR DISCHARGE VALVES

(71) Applicant: VICTREX MANUFACTURING LIMITED, Thornton Cleveleys (GB)

(72) Inventors: Andrew Anderson, Thornton Cleveleys (GB); Steven Lamoriniere, Thornton Cleveleys (GB); Siren Tan, Thornton Cleveleys (GB)

(73) Assignee: VICTREX MANUFACTURING LIMITED, Thornton Cleveleys (GB)

( * ) Notice: Subject to any disclaimer, the term of this patent is extended or adjusted under 35 U.S.C. 154(b) by 95 days.

(21) Appl. No.: 18/254,078

(22) PCT Filed: Nov. 3, 2021

(86) PCT No.: PCT/GB2021/052840
§ 371 (c)(1),
(2) Date: May 23, 2023

(87) PCT Pub. No.: WO2022/112738
PCT Pub. Date: Jun. 2, 2022

(65) Prior Publication Data
US 2024/0003345 A1    Jan. 4, 2024

(30) Foreign Application Priority Data

Nov. 25, 2020 (GB) ...................... 2018522

(51) Int. Cl.
*F16K 15/06* (2006.01)
*B32B 27/08* (2006.01)
(Continued)

(52) U.S. Cl.
CPC ............ *F04B 53/108* (2013.01); *B32B 27/08* (2013.01); *B32B 27/20* (2013.01); *B32B 27/285* (2013.01);
(Continued)

(58) Field of Classification Search
None
See application file for complete search history.

(56) References Cited

U.S. PATENT DOCUMENTS

| 3,994,319 A | 11/1976 | Airhart | |
| 7,984,891 B2 * | 7/2011 | Crockett | F16K 99/0001 251/63.5 |

(Continued)

FOREIGN PATENT DOCUMENTS

| CN | 103775311 A | * | 5/2014 |
| CN | 106286228 A | * | 1/2017 |

(Continued)

OTHER PUBLICATIONS

Blundell & Osborn, "The morphology of poly(arly-ether-ether-ketone)" Polymer 1983, 24: 953-958.

(Continued)

*Primary Examiner* — Matthew W Jellett
(74) *Attorney, Agent, or Firm* — Anne M. Reynolds; Casimir Jones, S.C.

(57) ABSTRACT

The invention relates to a linear compressor discharge valve. The valve comprises a valve body having a first layer of composite material, wherein the composite material of the first layer comprises polyaryletherketone and reinforcement filaments that are aligned with an axis of the first layer. The valve further comprises a second layer of composite material overlying the first layer of composite material. The composite material of the second layer comprises polyaryletherketone and reinforcement filaments that are aligned with an axis of the second layer. The axis of the second layer forms an angle of greater than 0 to less than 180° with the axis of the first layer.

19 Claims, 4 Drawing Sheets

(51) Int. Cl.
  *B32B 27/20*  (2006.01)
  *B32B 27/28*  (2006.01)
  *F04B 39/10*  (2006.01)
  *F04B 53/10*  (2006.01)
  *F16K 1/36*   (2006.01)
  *F16K 25/00*  (2006.01)

(52) U.S. Cl.
  CPC .............. *F04B 39/102* (2013.01); *F16K 1/36* (2013.01); *F16K 15/063* (2013.01); *F16K 25/005* (2013.01); *B32B 2250/02* (2013.01); *B32B 2262/106* (2013.01)

(56) References Cited

U.S. PATENT DOCUMENTS

| | | | | |
|---|---|---|---|---|
| 8,220,489 | B2* | 7/2012 | Brondum | F16K 11/0655 251/368 |
| 8,517,339 | B2* | 8/2013 | Bertini | B23P 11/00 251/368 |
| 9,291,274 | B1* | 3/2016 | Blume | F16K 15/063 |
| 10,933,738 | B2* | 3/2021 | Motin | B60K 15/03519 |
| 11,549,498 | B2* | 1/2023 | Kim | F04B 39/1026 |
| 2014/0084202 | A1* | 3/2014 | Mevius | G05D 16/0688 251/359 |
| 2016/0107376 | A1* | 4/2016 | Nakajima | H05K 1/0353 428/447 |

FOREIGN PATENT DOCUMENTS

| | | | |
|---|---|---|---|
| CN | 108661887 A | | 10/2018 |
| EP | 1221554 A | | 7/2002 |
| GB | 1414421 | | 11/1975 |
| GB | 2439208 A | | 12/2007 |
| GB | 2533291 A | | 6/2016 |
| JP | H10196543 A | | 7/1998 |
| KR | 20180097221 A | * | 8/2018 |
| WO | WO 2014/080346 A | | 5/2014 |

OTHER PUBLICATIONS

International Search Report and Written Opinion mailed Jan. 4, 2022, Intl. Appl. No. PCT/GB2021/052840, 13 pages.

* cited by examiner

LINEAR COMPRESSOR DISCHARGE VALVES

BACKGROUND

The present invention relates to a linear compressor discharge valve. The present invention also relates to a linear compressor comprising such a valve, as well as to a climatization container (for instance, a refrigerator or freezer) comprising such a linear compressor.

A compressor is an apparatus for compressing gas. Compressors have been widely used in appliances, such as refrigerators, for the compression and circulation of refrigerant gas. An example of a type of compressor is a linear compressor. In a linear compressor, a piston is linearly-reciprocated in a cylinder by a motor. The piston may be moved in one direction to draw refrigerant gas into the cylinder, and in the opposite direction to compress the refrigerant gas. A discharge valve may be positioned at an end of the cylinder, so that, once the refrigerant gas has been compressed to a threshold pressure, the discharge valve selectively opens to discharge refrigerant through, for example, the cooling coils of the appliance.

A linear compressor discharge valve may comprise a valve body. The valve body may take the form of a disc that forms a seal at an end of the cylinder of the compressor. The valve body may have the mechanical properties required to maintain a seal under high pressures. The linear compressor discharge valve may further comprise a resilient element such as a spring configured to bias the valve body to a closed position sealing an end of the cylinder. The resilient element may be configured such that the valve opens to discharge compressed refrigerant when the pressure in the cylinder exceeds a threshold value. For instance, the resilient element may comprise a compression spring positioned between the valve body and a support, the compression spring compressing when the threshold pressure in the cylinder is reached, permitting the valve body to separate from the cylinder thereby discharging compressed refrigerant.

In order to reduce or prevent escape of refrigerant from the cylinder before the threshold pressure is reached (while the valve body is in the closed position) it is desirable for the valve body to resist flexing. However, a competing performance requirement is to improve compressor energy efficiency by reducing the weight of the valve body (such that less kinetic energy is wasted in valve movement). Furthermore, making the valve body lighter results in quieter compressor operation as there is less impact force (and thus noise) as the valve body closes against the cylinder. Particularly for domestic refrigerators and freezers, reduced operational noise and enhanced energy efficiency are key market differentiators. It will be appreciated that for a given size and shape of discharge valve, weight may be reduced by making the valve body thinner, though further reductions in thickness for a given material are constrained by specified limits on valve body flexion.

Linear compressor discharge valves are typically formed of metal, for example, aluminium.

BRIEF DESCRIPTION OF THE DRAWINGS

Embodiments of the present invention are described, by way of example, with reference to the following figures, in which.

DESCRIPTION

Figure 1:
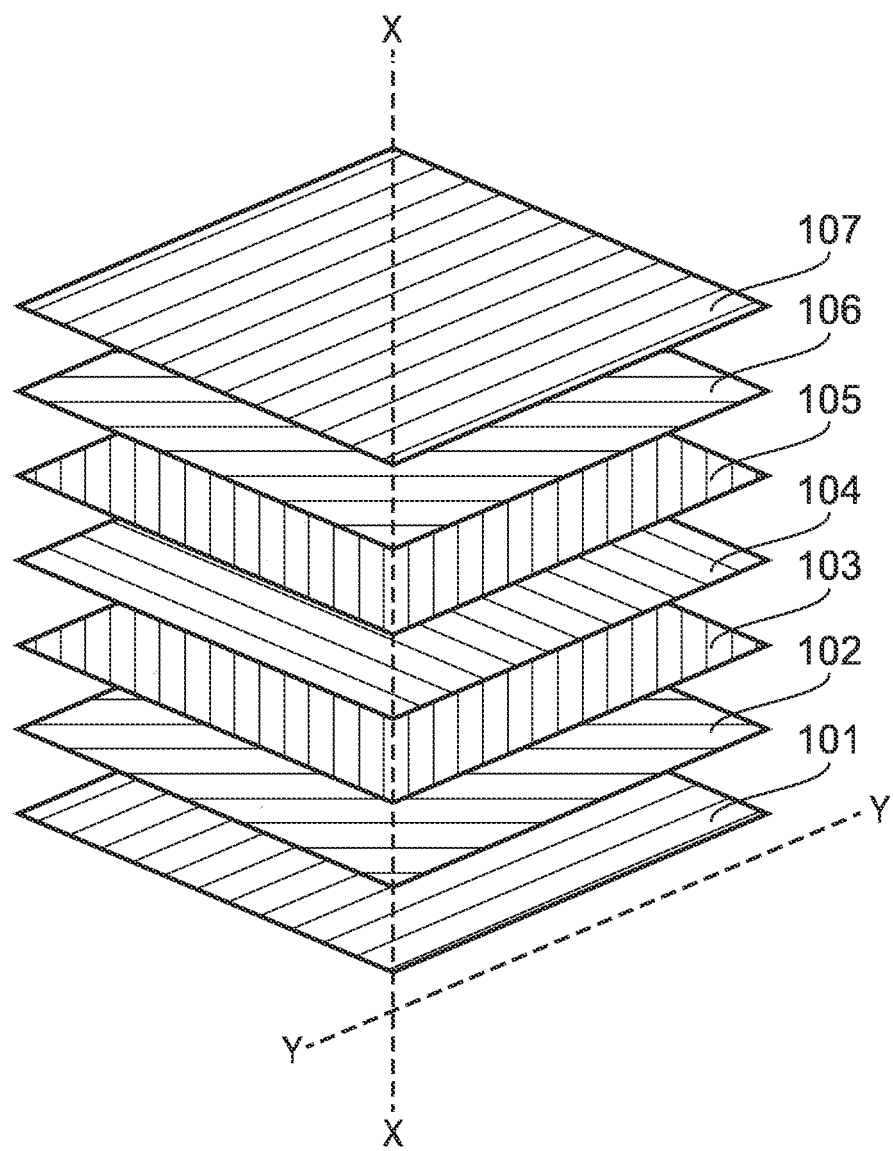
FIG. 1 is a schematic drawing of an example lay-up arrangement that may be used to manufacture a linear compressor discharge valve according to an example of the present disclosure.

According to one aspect of the present disclosure, there is provided a linear compressor discharge valve comprising a valve body. The valve body comprises a first layer of composite material and a second layer of composite material overlying the first layer of composite material. The composite material of the first layer comprises polyaryletherketone and reinforcement filaments that are aligned with an axis of the first layer. The composite material of the second layer comprises polyaryletherketone and reinforcement filaments that are aligned with an axis of the second layer. The axis of the second layer forms an angle of greater than 0 to less than 180° with the axis of the first layer.

It has been found that, by forming the valve body with a first layer of composite material and second layer of composite material as described above, the mechanical properties of the valve body can be improved. Because the reinforcement filaments are aligned, the relative amount of polyaryletherketone to reinforcement filaments in the composite material can be more uniformly controlled throughout each layer and optimised to provide desired mechanical properties to the composite material. By aligning the reinforcement filaments, layers can be made with more consistent mechanical properties throughout the layer. The angle between filaments of the overlying first and second layers can also be controlled to optimise the mechanical properties of the valve body. As a result, valves according to examples of the present disclosure can have superior mechanical properties compared to, for example, valves formed from composites formed of non-woven reinforcement fibre mats of polyaryletherketone. Valves according to examples of the present disclosure may also provide a better balance between mechanical properties, for instance stiffness, and weight.

The composite material of the first layer may comprise the same polyaryletherketone as the composite material of the second layer. The composite material of the first layer may comprise the same reinforcement filaments as the composite material of the second layer. The composite material of the first layer may comprise the same polyaryletherketone and reinforcement filaments as the composite material of the second layer. The composite material of the first layer may be the same as the composite material of the second layer.

Where the valve body is formed of more than two layers of composite material, the composite material in the majority of the layers is the same. The composite material may be the same in at least 70% of the layers, preferably in at least 80% of the layers, more preferably in at least 90% of the layers. The composite material in substantially all of the layers may be the same.

In some examples, the composite material of the first layer and/or the composite material of the second layer comprises 40 to 70 vol % of reinforcement filament. Preferably, the composite material of the first layer and/or the composite material of the second layer comprises 55 to 65 vol % of reinforcement filament. More preferably, the composite material of the first layer and/or the composite material of the second layer comprises 57 to 62 vol % of reinforcement filament. Because the reinforcement filaments are aligned, composite material having a relatively high reinforcement filament content may be produced. By using continuous reinforcement filaments aligned throughout each layer, the relative proportions of reinforcement filament to polyaryletherketone may be controlled more uniformly throughout each layer. By varying the angle between adjacent layers or plies of composite material and the total number of layers/plies, the mechanical properties of the valve body may be optimised.

In some examples, the composite material of first layer and/or the composite material of the second layer comprises a polyaryletherketone having a $T_g$ of at least 140 degrees C. The $T_g$ or glass transition temperature may be measured according to ISO 11357. The glass transition is a process in which a polymer glass changes on heating to a polymer melt. The $T_g$ of the polyaryletherketone may be at least 142 degrees C., preferably, at least 143 degrees C., more preferably at least 145 degrees C., yet more preferably at least 147 degrees C. In some cases, the polyaryletherketone may have a $T_g$ is at least 150 degrees C.

The composite material of first layer and/or the composite material of the second layer may comprise a polyaryletherketone selected from at least one of polyetheretherketone (PEEK), polyetherketone (PEK), polyetherketoneetherketoneketone (PEKEKK). Preferably, the polyaryletherketone is selected from polyetheretherketone (PEEK) and polyetherketone (PEK). More preferably, the polyaryletherketone is polyetherketone (PEK).

In some examples, the reinforcement filaments formed from carbon fibre. The reinforcement filaments may be continuous filaments that extend across the length or width of each layer.

In some examples, the amount of carbon fibre in the composite material is 55 to 65 vol %. The amount of carbon fibre in the composite material is preferably 57 to 62 vol %.

Preferably, the first layer of composite material is formed from at least one strip of tape of the composite material. The reinforcement filaments of each strip of tape may be aligned with the longitudinal axis of each strip of tape. Several strips of tape may be aligned to form the first layer.

The second layer of composite material may also be formed from at least one strip of tape of the composite material. The reinforcement filaments of each strip of tape are aligned with the longitudinal axis of each strip of tape. Several strips of tape may be aligned to form the first layer.

The first and second layers may be adjacent to one another. In some examples, there may be further layers positioned between the first and second layers, or overlying and/or underlying the first and second layers.

The reinforcement filaments of a given layer may be at an angle to the reinforcement filaments of adjacent layers. For instance, in one example, the reinforcement layer of a first layer may be aligned along an axis "a". A second layer may be positioned over the first layer, such that the filaments of the second layer form an angle with axis "a". This angle may be from greater than 0 to less than 180°. In some examples, the axis of the second layer may form an angle of greater than 0 to ≤90° with the axis of the first layer. In some examples, the axis of the second layer forms an angle of greater than 0 to ≤45° with the axis of the first layer.

A third layer may be positioned over the second layer, such that the filaments of the second layer form an angle with the filaments of the second layer of, for example, greater than 0 to less than 180°, preferably greater than 0 to ≤90°, more preferably greater than 0 to ≤45° (e.g. 45°). The lay-up pattern may be continued, such that the reinforcement filaments of each layer forms an angle with the filaments of the underlying layer of greater than 0 to less than 180°, preferably greater than 0 to ≤90°, more preferably greater than 0 to ≤45° (e.g. 45°). In cases where this angle is 45°, the lay-up arrangement may be 0°, 45°, 90°,−45°, 0°. The precise lay-up pattern and/or number of layers may be varied depending on e.g. the mechanical properties desired to be achieved.

In some instances, it may be possible to arrange two adjacent layers such that the filaments are aligned. For instance, two adjacent layers at the surface of the valve body may be aligned, but the next layer arranged such that its reinforcement filaments form an angle with the reinforcement filaments of the underlying two layers. As an example, the lay-up pattern may be 0°, 0°, 45°, 90°, −45°, 0°, 0°. As discussed above, the number and orientation of the layers may be varied depending on, for example, the mechanical properties desired in the final valve body.

The valve body may be formed by compression moulding the layers of composite material. The valve body may be disc-shaped. The valve body may also comprise a protrusion that may act as a seat for a spring or resilient member. The protrusion may extend from a central region of the disc-shaped valve body. In some examples, the protrusion and the remainder of the valve body may be compression moulded from the layers as a single piece (and then machined to the required dimensions). In other examples, the protrusion may be formed by another method, for instance, by injection moulding the protrusion in a separate manufacturing step. Machining may also remove part or the whole of one or more layers from the lay-up pattern from upper or lower surfaces of the valve body.

The present disclosure also relates to a linear compressor comprising a valve as described herein. The present disclosure also relates to a climatization container comprising such a linear compressor. The climatization compressor may take the form of a refrigerator or freezer. In other examples, the linear compressor may form part of an air-conditioning unit.

Polyaryletherketone

The layers of the valve body may be formed of composite material comprising any suitable polyaryletherketone. Suitable polyaryletherketones and their methods of manufacture are described, by way of example, in GB GB1414421 and GB2439208, which are incorporated herein by reference.

The polyaryletherketone may be a polymer having a repeat unit of general formula I:

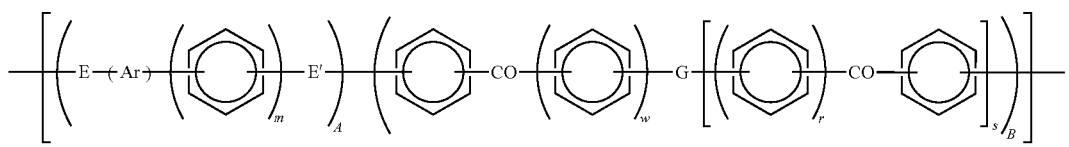

wherein A and B independently represent 0 or 1;
E and E' is each independently selected from an oxygen or a sulphur atom or a direct link;
each G is independently selected from an oxygen atom, a sulphur atom, a direct link or a —O-Ph-O-moiety, where Ph represents a phenyl moiety;
each m, w, r and s is independently 0, 1, 2 or 3; and
each Ar is independently selected from one of the following moieties (i) to (iv) which is bonded by one or more of its phenyl moieties, preferably in its 4,4'-positions) to adjacent moieties:

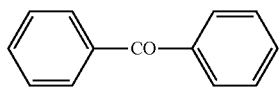 (i)

-continued

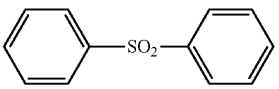 (ii)

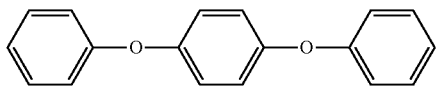 (iii)

 (iv)

As an alternative to I above, the polyaryletherketone may comprise a polymer having a repeat unit of the general formula I*

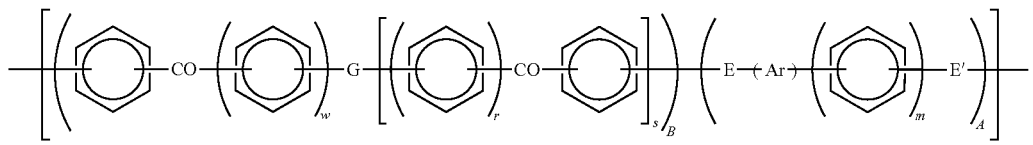

where A, B, E, E', G, m, r, s, and w are as described in relation to formula I above.

Where the polyaryletherketone comprises a polymer having a repeat unit of the general formula I, the polyaryletherketone may be a homopolymer having repeat units of the general formula I. Alternatively, the polyaryletherketone may be a random or block copolymer of at least two different units of formula I.

Where the polyaryletherketone comprises a polymer having a repeat unit of the general formula I*, the polyaryletherketone may be a homopolymer having repeat units of the general formula I*. Alternatively, the polyaryletherketone may be a random or block copolymer of at least two different units of formula I*.

Preferably, m is 0, 1, or 2, more preferably 0 or 1. Preferably, r is in the range is 0, 1, or 2, more preferably 0 or 1. Preferably, s is 0 or 1. Preferably, w is 0 or 1.

In some examples, the polyaryletherketone comprises a repeat unit of the formula II:

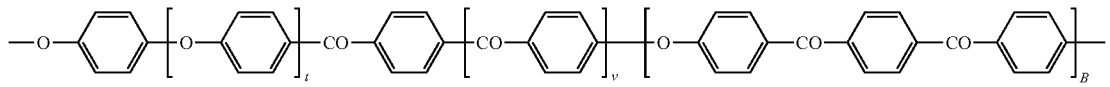

where t, v and b independently represent 0 or 1.

The polyaryletherketone may comprise (e.g. at least 80 mol %, preferably at least 90 mol %, especially at least 95 mol % of polyaryletherketone comprises), more preferably consists essentially of, a repeat unit of the formula II.

In some examples, the polyaryletherketone may have repeating units of formula III below:

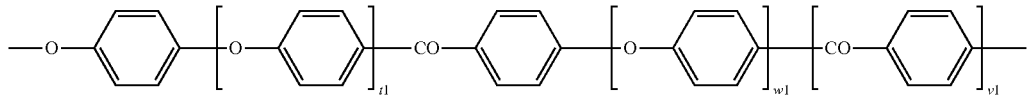

where t1 and w1 are independently represent 0 or 1 and v1 represents 0, 1 or 2.

The polyaryletherketone suitably includes at least 90, 95 or 99 mol % of repeat unit of formula III.

The polyaryletherketone may comprise or consist essentially of a repeat unit of formula III. Preferred polymeric materials comprise (or consist essentially of) a said repeat unit wherein t1=1, v1=0 and w1=0; t1=0, v1=0 and w1=0; t1=0, w1=1, v1=2; or t1=0, v1=1 and w1=0. More preferably, the polyaryletherketone comprises (e.g. consists essentially of) the repeat unit III, wherein t1=1, v1=0 and w1=0; or t1=0, v1=0 and w1=0. The most preferred polyaryletherketone comprises (especially consists essentially of) a said repeat unit wherein t1=1, v1=0 and w1=0.

In preferred embodiments, the polyaryletherketone is selected from polyetheretherketone (PEEK), polyetherketone (PEK), polyetherketoneketone (PEKK), polyetheretherketoneketone (PEEKK) and polyetherketoneetherketoneketone (PEKEKK). In a more preferred embodiment, the polyaryletherketone is selected from polyetherketone (PEK) and polyetheretherketone (PEEK).

In some examples, the polyaryletherketone may have a tensile strength, measured in accordance with ISO 527 of at least 90 MPa. The tensile strength is preferably greater than 100 MPa. In some examples, the tensile strength may be 95 to 150 MPa, for example, 98 to 120 MPa or 100 to 115 MPa.

In some examples, the polyaryletherketone may have a flexural strength, measured according to ISO 178, at yield at 23 degrees C. of at least 145 MPa, preferably at least 150 MPa, more preferably at least 155 MPa. The flexural strength may be 145 to 220 MPa, preferably 160 to 210 MPa, more preferably 165 to 200 MPa at yield at 23 degrees C.

In some examples, the polyaryletherketone may have a flexural strength, measured according to ISO 178, at yield at 125 degrees C. of at least 65 MPa, preferably at least 70 MPa, more preferably at least 80 MPa. The flexural strength may be 65 to 120 MPa, preferably 70 to 115 MPa, more preferably 80 to 110 MPa or 85 to 105 MPa at yield at 125 degrees C.

In some examples, the polyaryletherketone may have a flexural strength, measured according to ISO 178, at yield at 175 degrees C. of at least 10 MPa, preferably at least 15 MPa, more preferably at least 18 MPa or at least 20 MPa. The flexural strength may be 10 to 60 MPa, preferably 15 to 55 MPa, more preferably 18 to 50 MPa or 20 to 45 MPa at yield at 175 degrees C.

In some examples, the polyaryletherketone may have a flexural strength, measured according to ISO 178, at yield at 275 degrees C. of at least 10 MPa, preferably at least 11 MPa, more preferably at least 12 MPa. The flexural strength may be 10 to 20 MPa, preferably 11 to 18 MPa, more preferably 12 to 17 MPa at yield at 275 degrees C.

The polyaryletherketone may have a flexural modulus, measured in accordance with ISO 178, of at least 3.5 GPa, preferably at least 4 GPa. The flexural modulus is preferably in the range 3.5-4.5 GPa, more preferably in the range 3.8-4.4 GPa.

In some examples, the polyaryletherketone has a $T_g$ of at least 140 degrees C. The $T_g$ or glass transition temperature may be measured according to ISO 11357. The glass transition is a process in which a polymer glass changes on heating to a polymer melt. The $T_g$ of the polyaryletherketone may be at least 142 degrees C., preferably at least 143 degrees C., more preferably at least 145 degrees C., yet more preferably at least 147 degrees C. In some cases, the polyaryletherketone may have a $T_g$ is at least 150 degrees C. The $T_g$ of the polyaryletherketone may be 142 to 200 degrees C., preferably 143 to 180 degrees C., for example, 145 to 170 degrees C.

The $T_g$'s above may refer to the glass transition temperature that marks the onset of the glass transition of the polyaryletherketone. The midpoint of this transition may occur at at least at least 145 degrees C., preferably, at least 147 degrees C., more preferably at least 150 degrees C., yet more preferably at least 155 degrees C. (ISO 11357).

The polyaryletherketone may have a compressive strength according to ISO 604 at 23 degrees C. of at least 115 MPa, preferably at least 120 MPa, more preferably at least 125 MPa. For example, the compressive strength at 23 degrees C. may be 115 to 160 MPa, preferably 120 to 150 MPa or 125 to 145 MPa.

The polyaryletherketone may have a compressive strength according to ISO 604 at 120 degrees C. of at least 60 MPa, preferably at least 65 MPa, more preferably at least 70 MPa. For example, the compressive strength at 120 degrees C. may be 60 to 120 MPa, preferably 65 to 110 MPa or 70 to 100 MPa.

In some examples, the polyaryletherketone may have a Notched Izod Impact Strength (specimen 80 mm×10 mm×4 mm with a cut 0.25 mm notch (Type A), tested at 23° C., in accordance with ISO180) of at least 4 $KJmT^{-2}$, preferably at least 5 $KJmT^{-2}$, more preferably at least 6 $KJmT^{-2}$. The Notched Izod Impact Strength, measured as described above, may be less than 10 $KJmT^{-2}$, suitably less than 8 $KJmT^{-2}$. The Notched Izod Impact Strength, measured as described above, may be at least 3 $KJmT^{-2}$, suitably at least 4 $KJmT^{-2}$, preferably at least 5 $KJmT^{-2}$. The Notched Izod Impact Strength may be less than 50 $KJmT^{-2}$, suitably less than 30 $KJmT^{-2}$.

The polyaryletherketone suitably has a melt viscosity (MV) of at least 0.06 $kNsm^{-2}$, preferably has a MV of at least 0.09 $kNsm^{-2}$, more preferably at least 0.12 $kNsm^{-2}$. The polyaryletherketone (e.g. PEEK) may have a MV of less than 1.00 $kNsm^{-2}$, preferably less than 0.5 $kNsm^{-2}$.

The polyaryletherketone may have a MV in the range 0.09 to 0.5 $kNsm^{-2}$, preferably in the range 0.1 to 0.3 $kNsm^{-2}$, preferably having a MV in the range 0.1 to 0.2 kNsm$^{-2}$. An MV of 0.15 kNsm$^{-2}$ has been found to be particularly advantageous. MV is suitably measured using capillary rheometry operating at 400° C. at a shear rate of 1000s$^{-1}$ using a tungsten carbide die, 0.5 mm×3.175 mm.

In a preferred embodiment, the polyaryletherketone has a melt viscosity (MV) of 0.09 kNsm$^{-2}$ to 0.5 kNsm$^{-2}$.

The polyaryletherketone may be semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning calorimetry (DSC).

The level of crystallinity of said polyaryletherketone may be at least 1%, suitably at least 3%, preferably at least 5% and more preferably at least 10%. In especially preferred embodiments, the crystallinity may be greater than 25%.

The main peak of the melting endotherm (Tm) of the polyaryletherketone may be at least 300° C.

In some examples, the polyaryletherketone may be a PEK or PEEK having a $T_g$ of at least 140 degrees C. (ISO 11357). The $T_g$ of the PEK or PEEK may be at least 142 degrees C., preferably, at least 143 degrees C., more preferably at least 145 degrees C., yet more preferably at least 147 degrees C. In some cases, the polyaryletherketone is a PEK that has a $T_g$ is at least 150 degrees C. In some cases the polyaryletherketone is a PEEK that has a $T_g$ of at least 142 degrees C.

In some examples, the polyaryletherketone may be a PEK or PEEK having a flexural strength, measured according to ISO 178, at yield at 23 degrees C. of at least 145 MPa, preferably at least 150 MPa, more preferably at least 155 MPa. The flexural strength may be 145 to 220 MPa, preferably 160 to 210 MPa, more preferably 165 to 200 MPa at yield at 23 degrees C. In some examples, the polyaryletherketone is a PEK having a flexural strength at yield at 23 degrees C. of at least 160 MPa, preferably at least 170 MPa, for example, 180 MPa. In some examples, the polyaryletherketone is a PEEK having a flexural strength at yield at 23 degrees C. of at least 150 MPa, preferably at least 160 MPa, for example, 165 MPa.

In some examples, the polyaryletherketone may be a PEK or PEEK having a flexural strength, measured according to ISO 178, at yield at 125 degrees C. of at least 65 MPa, preferably at least 70 MPa, more preferably at least 80 MPa. The flexural strength may be 65 to 120 MPa, preferably 70 to 115 MPa, more preferably 80 to 110 MPa or 85 to 105 MPa at yield at 125 degrees C. in some examples, the polyaryletherketone is a PEK having a flexural strength at yield at 125 degrees C. of at least 90 MPa, preferably at least 95 MPa, for example, 105 MPa. In some examples, the polyaryletherketone is a PEEK having a flexural strength at yield at 125 degrees C. of at least 70 MPa, preferably at least 80 MPa, for example, 85 MPa.

In some examples, the polyaryletherketone may be a PEK or PEEK having a flexural strength, measured according to ISO 178, at yield at 175 degrees C. of at least 10 MPa, preferably at least 15 MPa, more preferably at least 18 MPa or at least 20 MPa. The flexural strength may be 10 to 60 MPa, preferably 15 to 55 MPa, more preferably 18 to 50 MPa or 20 to 45 MPa at yield at 175 degrees C. In some examples, the polyaryletherketone is a PEK having a flexural strength at yield at 175 degrees C. of at least 20 MPa, preferably at least 25 MPa, more preferably at least 30 MPa, for example, 32 MPa. In some examples, the polyaryletherketone is a PEEK having a flexural strength at yield at 175 degrees C. of at east 15 MPa, preferably at least 17 MPa, for example, 19 MPa.

In some examples, the polyaryletherketone may be a PEK or PEEK having a flexural strength, measured according to ISO 178, at yield at 275 degrees C. of at least 10 MPa, preferably at least 11 MPa, more preferably at least 12 MPa. The flexural strength may be 10 to 20 MPa, preferably 11 to 18 MPa, more preferably 12 to 17 MPa at yield at 275 degrees C. In some examples, the polyaryletherketone is a PEK having a flexural strength at yield at 275 degrees C. of at least 10 MPa, preferably at least 12 MPa, for example, 16 MPa. In some examples, the polyaryletherketone is a PEEK having a flexural strength at yield at 275 degrees C. of at least 10 MPa, for example, 12.5 MPa.

The composite material of any one of the layers of the valve body (e.g. the first layer and/or the second layer) may comprise any suitable amount of the polyaryletherketone. For example, the composite material may comprise at least 20 volume %, preferably at least 25 volume %, more preferably at least 30 volume %, yet more preferably at least 35 volume %, even more preferably at least 37 volume % and most preferably at least 39 volume % polyaryletherketone. The composite material comprises up to 48 volume % polyaryletherketone. In some embodiments, the composite material may comprise up to 45 volume %, up to 43 volume % polyaryletherketone.

In some embodiments, the composite material may comprise 20 to 48 volume %, preferably 30 to 48 volume %, more preferably 35 to 48 volume %, yet more preferably 37 to 48 volume % or 38 to 48 volume % polyaryletherketone. More preferably, the composite material may comprise 39 to 48 volume %, even more preferably 39 to 45 volume % polyaryletherketone. In some embodiments, the composite material may comprise 39 to 43 volume % polyaryletherketone.

The volume ratio of reinforcement filament to polyaryletherketone may be 1.1:1 to 1.5:1, for example, 1.2:1 to 1:4:1.

Reinforcement Filaments

The reinforcement filaments may be formed of any suitable reinforcement fibre may be used. The reinforcement filaments may be continuous such that they extend in a substantially uninterrupted manner across the length or width of each layer of the valve body.

The fibres used may be selected from inorganic or organic fibrous materials. The fibres may have a melting or decomposition temperature of greater than 200° C., for example, greater than 250° C. or greater than 300° C. In some embodiments, the fibres may have a melting temperature of greater than 350° C. or 500° C. Examples of suitable fibres include aramid fibres, carbon fibre, glass fibre, carbon fibre, silica fibre, zirconia fibre, silicon nitride fibre, boron fibre and potassium titanate fibre. Most preferred fibres are carbon fibres.

The reinforcement filaments (e.g. carbon fibre filaments) may have a tensile strength of greater than 3400 MPa, preferably greater than 3600 MPa, more preferably greater than 4000 MPa. In some examples, the reinforcement filaments may have a tensile strength of 3400 to 6000 MPa, preferably 3600 to 4800 MPa, more preferably 4200 to 4700 MPa. In some examples, the reinforcement filaments may have a tensile strength of 4500 to 4650 MPa.

The reinforcement filaments (e.g. carbon fibre filaments) may have a tensile modulus of greater than 200 GPa, preferably greater than 220 GPa. In some examples, the reinforcement filaments may have a tensile modulus of 200 to 300 GPa, preferably 210 to 280 GPa, more preferably 220 to 250 GPa.

The reinforcement filaments (e.g. carbon fibre filaments) may have a strain at failure of greater than 1.1%, preferably, greater than 1.2%, 1.4% or 1.6% In some embodiments, reinforcement filaments (e.g. carbon fibre filaments) may have a strain at failure of 1.2 to 2.2%, for example, 1.4 to 2.0% or 1.6 to 1.9%.

The reinforcement filaments (e.g. carbon fibre filaments) may have a mass per unit length of 0.1 to 1.0 g/m, for example, 0.2 to 0.8 g/m.

The reinforcement filaments (e.g. carbon fibre filaments) may have a density of greater than 1.65 g/cm$^3$, preferably greater than 1.70 g/cm$^3$. The reinforcement fibre (e.g. carbon fibre) may have a density of less than 1.85 g/cm$^3$, preferably less than 1.80 g/cm$^3$. In some embodiments, the reinforcement fibre (e.g. carbon fibre) may have a density of 1.70 to 1.85 g/cm$^3$, for example, 1.75 to 1.80 g/cm$^3$, or 1.78 to 1.79 g/cm$^3$.

The reinforcement filaments (e.g. carbon fibre filaments) may be provided in the form of a continuous tow. Any suitable tow size may be used. The tow size indicates the number of filaments in the tow. In some embodiments, the tow size may be 1000 to 24,000. In one embodiment, a tow size of 3000, 6000 or 12,000 may be employed.

The filaments may have an average filament diameter of 4 to 10 microns, preferably 5 to 8 microns.

Examples of suitable reinforcement filaments include carbon fibres supplied, for example, by Hexcel® under the trademark HexTow®.

The reinforcement filaments (e.g. carbon fibre filaments) may be present in an amount of 30 to 68 volume %, preferably 40 to 65 volume %. Preferably, the reinforcement fibre may be present in an amount of 50 to 62 volume %, for instance, 52 to 58 volume % based on the total volume of the composite material.

The reinforcement filaments may be untwisted. Where the composite material is formed into tape, the filaments may be substantially aligned along the longitudinal axis of the tape.

Composite Material

The composite material may be formed as tape. For example, the reinforcement fibre (e.g. carbon fibre) may be combined with the polyaryletherketone (e.g. PEK or PEEK) and formed into a tape. A plurality of tapes may be joined to form a layer and the layers may be compression moulded to form the compression moulded body portion of the device. In an embodiment, the polyaryletherketone (e.g. PEK or PEEK) may be heated to above its softening or melting temperature to melt or soften the polymer around the fibres to form the composite. The molten or soften polymer is then compressed around the fibres.

When heat is applied, suitable temperatures include temperatures of 320° C. and above, preferably, of 330° C. and above, more preferably, of 340° C. and above. In some embodiments, compression moulding may be carried out at temperatures of 320 to 450° C., preferably 330 to 400° C., more preferably 340 to 380° C. and yet more preferably 350 to 370° C. Suitably, pressures of at least 1.5 MPa or at least 2 MPa may be applied. Examples of suitable pressures range from 1.5 to 10 MPa, for instance, 2 to 8 MPa.

The tape or layer formed using the composite material of the present invention may have a thickness of 10 microns to 1 mm, preferably 100 to 300 microns, more preferably 140 to 200 microns.

In some examples, the tape or layer may have a tensile strength, measured in accordance with ISO 527 of at least 400 MPa. The tensile strength is preferably greater than 500 MPa. In some examples, the tensile strength may be 400 to 1000 MPa, for example, 500 to 900 MPa or 700 to 850 MPa.

The tape or layer may have a tensile modulus of greater than 200 GPa, preferably greater than 40 GPa. In some examples, tensile modulus may be 40 to 100 GPa. The tensile strength may be measured by ISO 527.

The tape or layer may have a compressive modulus of at least 80 GPa, for example, at least 100 GPa. The compressive modulus may be measured by ASTM 6641.

In some examples, the tape or layer may have a flexural strength, measured according to ISO 178, at yield at 23 degrees C. of at least 145 MPa, preferably at least 150 MPa, more preferably at least 155 MPa. The flexural strength may be 145 to 220 MPa, preferably 160 to 210 MPa at yield at 23 degrees C.

Linear Compressor Discharge Valve

These and other aspects of the present invention will now be described with reference to the accompanying drawings.

Referring to FIG. 1, this is a schematic drawing of an example lay-up arrangement of layers of tape formed from the composite material of an embodiment of the present invention. Starting from the bottom of the lay-up as shown, the first layer 101 is formed of tape that is unidirectionally aligned along a Y axis (0°). The Y axis lies in the plane defined by each layer of tape, and is perpendicular to an X axis extending normally to each layer of tape. The second layer 102 is formed of tape that is unidirectionally aligned at 45° to the axis of the first layer 101. The third layer 103 is formed of tape 14c that is unidirectionally aligned at −45° to the axis of the first layer 101. The fourth layer 104 is formed of tape 14d that is unidirectionally aligned at 90° to the axis of the first layer 101. The pattern is repeated so that the overall structure has the following alignment: 0°, 45°, −45°, 90°, −45°, 45° and 0. The resulting laminate may be compression moulded under heat and pressure to form the compression moulded body portion of a valve body.

Figure 2A:
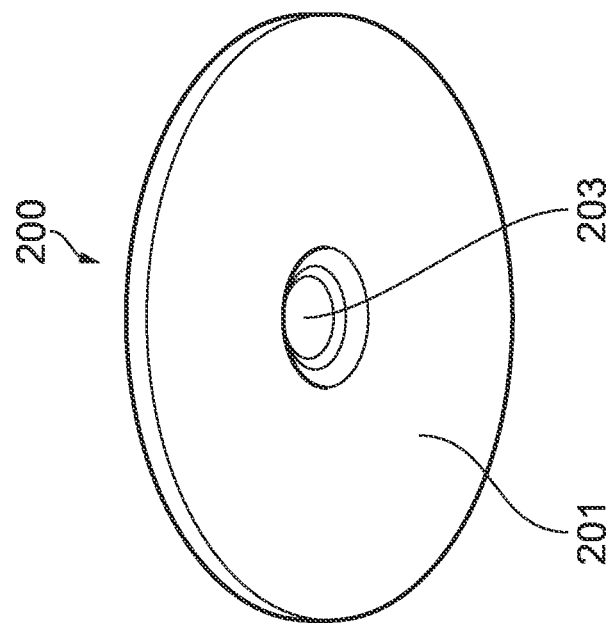
FIGS. 2a and 2b are upper and lower perspective views of a linear compressor discharge valve according to an example of the present disclosure.
Figure 2B:
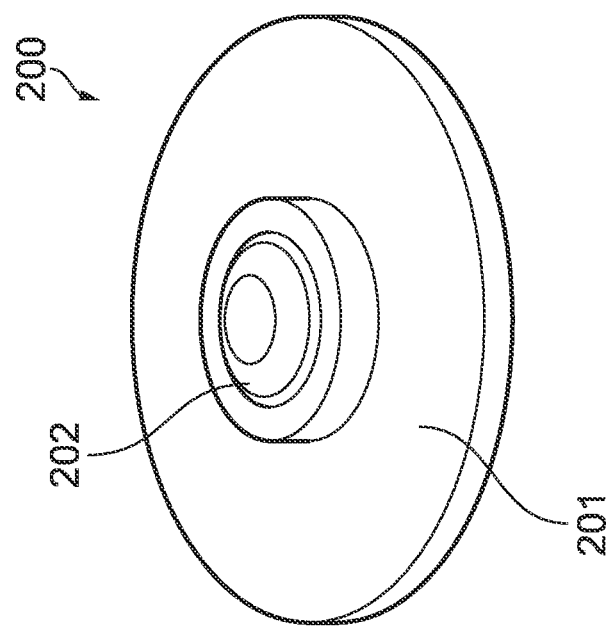

Referring to FIGS. 2a and 2b, these are upper and lower perspective views respectively of a discharge valve body 200 according to an example of the present disclosure. The valve body 200 comprises a disc-shaped portion 201 and a protrusion 202 that may act as a seat for a resilient member or spring (not shown) For instance, a spring may fit over the protrusion 202 such that it securely engages the protrusion 202. As discussed above, the protrusion 202 may be formed through the same compression moulding process as the disc portion 201 or may be separately formed (for instance, through injection moulding, indicated by different shading. The protrusion 202 may have any required shape to which a spring may be attached. The invention is not limited to any particular form of protrusion 202. More generally, the invention is not limited to any particular shape or dimensions of the valve body 200. The disc-shaped portion 201 may be formed as illustrated with a central raised portion 203 to which the protrusion 14 may be secured. The central raised portion 203 may be indented on the side facing away from the protrusion 202. In use, within a linear compressor (described in more detail below in connection with FIG. 3) the protrusion 202 supports a spring which biases the valve body 200 towards an open end of a piston cylinder such that the underside of the disc-shaped portion 201—opposite to the protrusion 202 closes off the opening in the piston cylinder.

In certain examples, the diameter of the valve body 200, particularly the diameter of the disc-shaped portion 201, may be 10 to 30 mm, for instance 29.8 mm. The protrusion 202 may measure 5 to 15 mm across, for instance 14 mm as illustrated, with a tolerance of ±0.1 mm. The recess underneath the protrusion 202 may have a diameter of approximately 6 mm. The recess is not essential and may be omitted. Certain examples of the valve body may have a flat underside. The disc-shaped portion 201 of the valve body may have a thickness of 1.3 mm. The thickness of the valve body 200 including the protrusion 202 may be 2 mm. The top edge of the protrusion 202 may be curved with a radius of 0.3 mm. It will be appreciated that the dimensions are variable dependent upon the particular required dimensions for the linear compressor. Additionally, the curved profile of the protrusion 202 may be omitted. The valve body may weigh from about 1 g to about 30 g, preferably 1 to 10 g, for instance, 1 to 2 g (e.g. 1.8 to 2 g).

The valve body 200 may be formed from tape (not shown) of composite material comprising polyaryletherketone and reinforcement filaments. The polyaryletherketone may be PEK or PEEK and the reinforcement filaments may be carbon fibre filaments. The reinforcement filaments may be aligned with the longitudinal axis of the tape. Strips of tape may be aligned to form each layer, such that the reinforcement filaments are aligned along an axis of each layer. Layers of tape may be stacked over one another and the overlying layers compression moulded to form the valve body 200 in a manner similar to that described with reference to FIG. 1 above. The reinforcement filaments of one layer in the stack may form an angle of greater than 0 to less than 180 degrees with the reinforcement filaments of at least one other layer in the stack.

The protrusion 14 may be formed in a separate step, for example, by injection moulding a polyaryletherketone composition. Alternatively, the protrusion may also be formed in the same compression moulding process.

Figure 3:
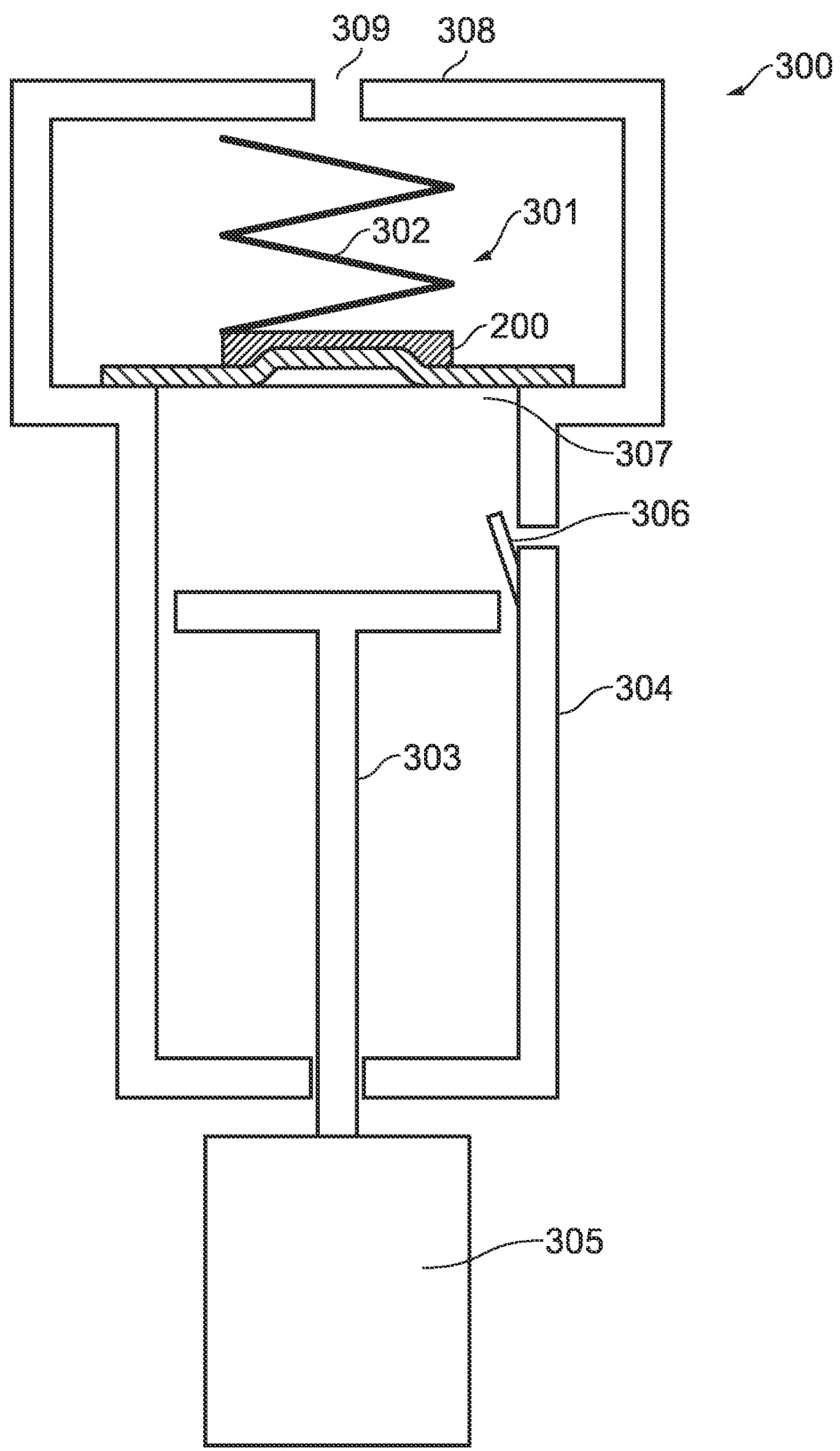
FIG. 3 is a schematic drawing of a cross-section of a linear compressor including a discharge valve according to an example of the present disclosure.

Referring to FIG. 3, this is a schematic drawing of a cross-section of linear compressor 300 including a discharge valve 301. The discharge valve 301 includes a valve body 200 according to FIG. 2 and spring 302. The linear compressor 300 further comprises a piston 303 arranged to linearly-reciprocate in a cylinder 304. The piston movement is driven by a motor 305, the details of which fall outside of the scope of the present disclosure. The piston 303 may be moved by the motor 305 in one direction (downwards in FIG. 3) to draw refrigerant gas into the cylinder through an inlet valve 306, and in the opposite direction to compress the refrigerant gas. The discharge valve 301 is positioned at an end of the cylinder 304 and comprises an open portion 307 of the cylinder 304 closed off by the valve body 200. The valve body 200 is biased to close off the open portion 307 of the cylinder 304 by spring 302 which is compressed between the valve body 200 and a side of an outlet chamber 308. Once the refrigerant gas has been compressed to a threshold pressure, the pressure in the cylinder 304 acting on the valve body 200 exceeds the spring force and the discharge valve 301 opens as the spring 302 compresses. Refrigerant is discharged through outlet 309, for example, the cooling coils of a refrigerator (not shown).

Example 1

A valve body 12 similar to that shown in FIG. 2 was formed using unidirectional tape formed from a composite material comprising 41-42 vol % PEEK (Victrex® PEEK, Tg 143 degrees C.) and 58-59 vol % carbon fibre filaments (HexTow® IM7). The carbon fibre filaments were aligned with the longitudinal direction of the tape. Strips of tape were aligned to form each layer of composite material. A stack of 9 to 12 layers was compression moulded to form the valve body. The carbon fibre filaments in at least one of the layers formed an angle of greater than 0 and less than 180 degrees with at least one other layer in the stack. In this particular example, the angle between the reinforcement filaments in one layer and the reinforcement filaments in adjacent layers was greater than 0 and ≤45 degrees. The stack was compression moulded to form the valve body 12.

Example 2

Example 1 was repeated using unidirectional tape formed from a composite material comprising 41-42 vol % PEK (Victrex®, Tg 152 degrees C.) and 58-59 vol % carbon fibre filaments (HexTow® AS4C).

Reference Example A

Example 1 was repeated but instead of using unidirectional tape, each layer of the compression moulded valve body 12 was formed using a carbon fibre fabric comprising 50 vol % PEEK (Victrex®) and non-woven, randomly aligned carbon fibre (50 vol %).

Example 3

In this Example, the performance of the valve bodies formed in Examples 1, 2 and Reference Example A were compared.

Each valve body was used to seal the mouth of a cylinder. The cylinder wall was 1 mm thick. A downward sealing pressure of 25 bar was applied to the valve body at a temperature of 150 degrees C. for 14 days. All valve bodies were subjected to the same treatment.

Figure 4:
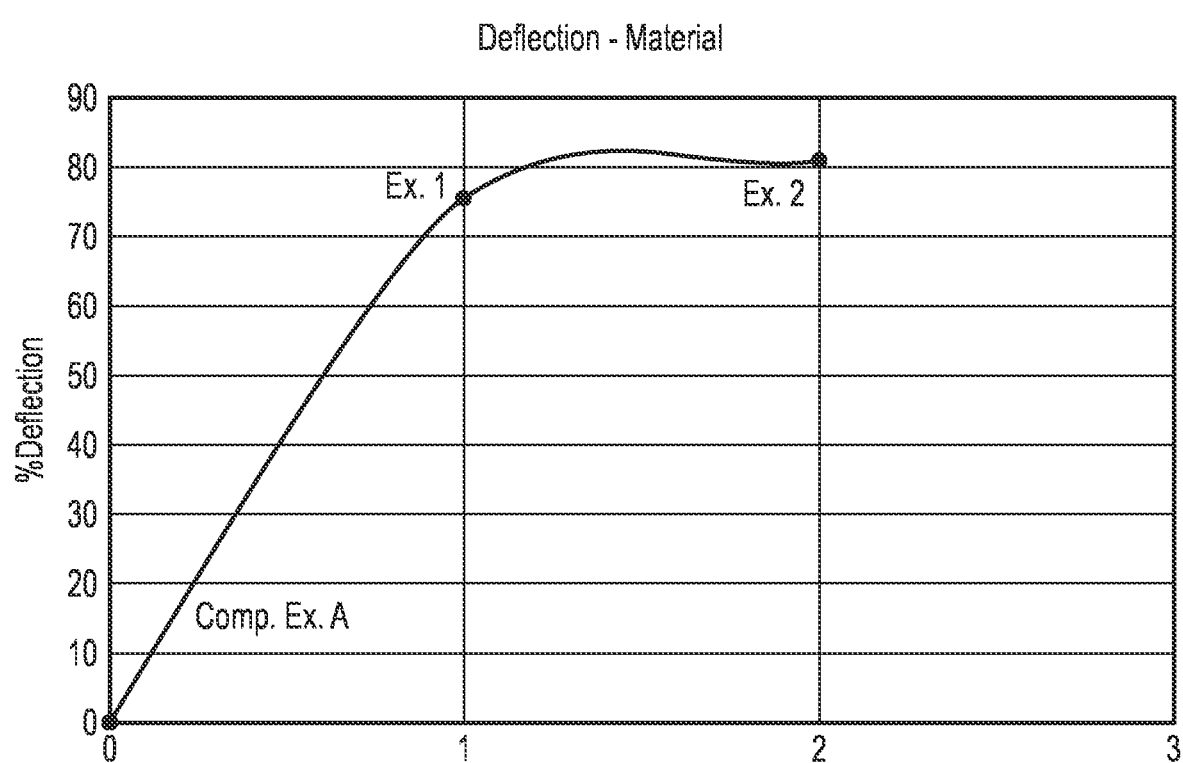
FIG. 4 is a graph showing the performance of two linear compressor discharge valves according to examples of the present disclosure compared to the performance of a linear compressor discharge valve according to a reference example.

After 14 days, the valve bodies were examined and the maximum deflection from the horizontal was measured. The valve body of Reference Example A was observed to have suffered the most deflection. The deflection observed with Example 1 was 60% less than that observed with Reference Example A. The deflection observed with Example 2 was 70% less than that observed with Reference Example A. The percentage improvements are shown in FIG. 4.

Definitions

It is noted that, as used in this specification and the appended claims, the singular forms "a," "an," and "the" include plural referents unless the content clearly dictates otherwise.

As used herein, the term "about" is used to provide flexibility to a range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each individual member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if the numerical value and sub-range is recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

The invention claimed is:

1. A linear compressor discharge valve comprising:
   a valve body comprising:
   a first layer of composite material, wherein the composite material of the first layer comprises polyaryletherketone and reinforcement filaments that are aligned with an axis of the first layer, and
   a second layer of composite material overlying the first layer of composite material, wherein the composite material of the second layer comprises polyaryletherketone and reinforcement filaments that are aligned with an axis of the second layer, wherein the axis of the second layer forms an angle of greater than 0 to less than 180° with the axis of the first layer,
   wherein the composite material of the first layer and/or the composite material of the second layer comprises 40 to 70 vol % of reinforcement filament.

2. The valve as claimed in claim 1, wherein the composite material of the first layer and/or the composite material of the second layer comprises 55 to 65 vol % of reinforcement filament.

3. The valve as claimed in claim 1, wherein the composite material of first layer and/or the composite material of the second layer comprises a polyaryletherketone having a Tg of at least 140 degrees C.

4. The valve as claimed in claim 1, wherein the composite material of first layer and/or the composite material of the second layer comprises a polyaryletherketone selected from at least one of polyetheretherketone (PEEK), polyetherketone (PEK), polyetherketoneetherketoneketone (PEKEKK).

5. The valve as claimed in claim 1, wherein the polyaryletherketone of the composite material of first layer is the same as the polyaryletherketone of the composite material of the second layer.

6. The valve as claimed in claim 1, wherein the composite material of the first layer and/or the composite material of the second layer comprises reinforcement filaments formed from carbon fibre.

7. The valve as claimed in claim 1, wherein the composite material of the first layer and/or the composite material of the second layer comprises polyetheretherketone (PEEK) and reinforcement filaments formed from carbon fibre; and wherein the amount of carbon fibre in the composite material is 55 to 65 vol %.

8. The valve as claimed in claim 1, wherein the composite material of the first layer and/or the composite material of the second layer comprises polyetherketone (PEK) and reinforcement filaments formed from carbon fibre; and wherein the amount of carbon fibre in the composite material is 55 to 65 vol %.

9. The valve as claimed in claim 1, wherein the first layer of composite material is formed from at least one strip of tape of the composite material, wherein the reinforcement filaments of each strip of tape are aligned with the longitudinal axis of each strip of tape.

10. The valve as claimed in claim 1, wherein the second layer of composite material is formed from at least one strip of tape of the composite material, wherein the reinforcement filaments of each strip of tape are aligned with the longitudinal axis of each strip of tape.

11. The valve as claimed in claim 1, wherein the valve body comprises more than two layers of composite material.

12. The valve as claimed in claim 1, wherein the layers of composite material are formed from the same composite material.

13. The valve as claimed in claim 1, wherein the axis of the second layer forms an angle of greater than 0 to ≤90° with the axis of the first layer.

14. The valve as claimed in claim 1, wherein the axis of the second layer forms an angle of greater than 0 to ≤45° with the axis of the first layer.

15. The valve as claimed in claim 1, wherein valve body is formed by compression moulding the layers of composite material.

16. The valve as claimed in claim 1, wherein the valve body is disc-shaped.

17. A linear compressor comprising a valve as claimed in claim 1.

18. A climatization container comprising a linear compressor as claimed in claim 17.

19. The climatization container as claimed in claim 18, wherein the climatization container comprises a refrigerator or freezer.

* * * * *